United States Patent [19]

Tzikas

[11] Patent Number: 5,243,033
[45] Date of Patent: Sep. 7, 1993

[54] FIBER-REACTIVE DISAZO AND TETRAKISAZO HALOTRIAZINYL DYES

[75] Inventor: Athanassios Tzikas, Pratteln, Switzerland

[73] Assignee: Ciba-Geigy Corporation, Ardsley, N.Y.

[21] Appl. No.: 819,709

[22] Filed: Jan. 13, 1992

[30] Foreign Application Priority Data

Jan. 16, 1991 [CH] Switzerland ............... 106/91

[51] Int. Cl.⁵ ............... C09B 62/09; D06P 1/382; D06P 3/32; D06P 3/66
[52] U.S. Cl. ............... 534/634; 534/637; 534/583; 534/829; 534/831; 534/887
[58] Field of Search ............... 534/637, 634

[56] References Cited

U.S. PATENT DOCUMENTS

| 3,974,160 | 8/1976 | Seiler et al. ............ 534/637 X |
| 4,473,499 | 9/1984 | Niwa et al. ............ 534/637 |
| 4,670,547 | 6/1987 | Lehr ............ 534/637 |
| 4,906,739 | 3/1990 | Seiler et al. ............ 534/638 |
| 4,997,919 | 3/1991 | Schaulin ............ 534/637 |

FOREIGN PATENT DOCUMENTS

| 0725154 | 1/1966 | Canada ............ 534/637 |
| 0313513 | 4/1989 | European Pat. Off. ............ 534/638 |
| 1184700 | 7/1969 | France ............ 534/637 |
| 60-215882 | 10/1985 | Japan ............ 534/637 |
| 0445690 | 2/1968 | Switzerland ............ 534/637 |
| 0869279 | 5/1961 | United Kingdom ............ 534/637 |
| 952062 | 3/1964 | United Kingdom ............ 534/637 |
| 2040978 | 9/1980 | United Kingdom ............ 534/637 |

OTHER PUBLICATIONS

Chem. Abst., 111:136011, (Tzikas II), (1989).

Primary Examiner—Floyd D. Higel
Attorney, Agent, or Firm—Marla J. Mathias; Edward McC. Roberts

[57] ABSTRACT

Reactive dyes of the formula

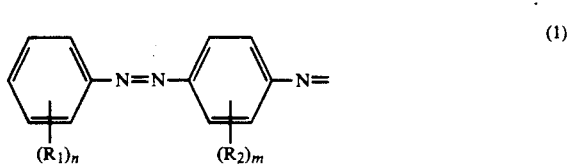
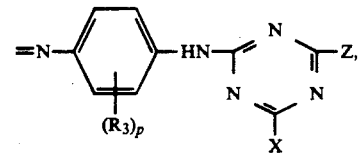

(1)

in which $R_1$, $R_2$ and $R_3$, independently of one another, are $C_1$–$C_4$alkyl, $C_1$–$C_4$alkoxy, halogen, ureido, $C_1$–$C_4$acylamino, carboxyl and sulfo and n, m and p, independently of one another, are the number 0, 1, 2 or 3, X is fluorine or chorine and Z is an aliphatic, araliphatic, aromatic or heterocyclic amino group free from fibre-reactive radicals; or Z is the radical of an aliphatic or aromatic diamine which contains the radical of the formula

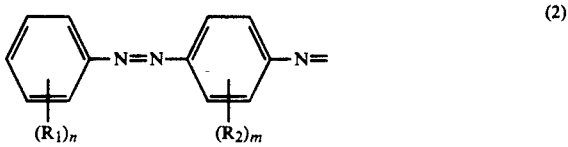
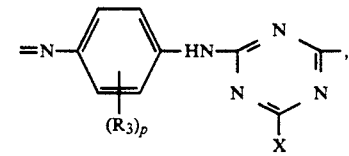

(2)

in which $R_1$, $R_2$, $R_3$, n, m, p and X are as defined, bound via the second amino group; or Z is a radical of the formula (List continued on next page.)

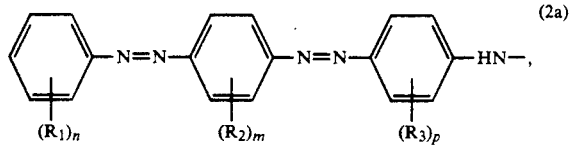
in which $R_1$, $R_2$, $R_3$, n, m, and p are as defined; or Z is a radical $-NH-SO_2-(CH_2)_2-OSO_3H$; and the reactive dye of the formula (1) contains at least two sulfo groups, produce, on cellulose fibres, orange dyeings of high color strength and prints of good fastness properties.
8 Claims, No Drawings

FIBER-REACTIVE DISAZO AND TETRAKISAZO HALOTRIAZINYL DYES

Reactive dyes are used to a large extent for the dyeing and printing of textile fibre materials. Although a large number of useful reactive dyes of different properties are available nowadays for various areas of application, the prior art achieved so far is in many cases not yet fully satisfactory, in view of the high requirements with respect to suitability for specific dyeing processes and level of fastness propertoes of the dyeings.

The object of the present invention is to find novel reactive dyes which are suitable for dyeing and printing processes and have a high degree of fixation and, at the same time, enable the unfixed portions to be readily washed off; furthermore, it is desired that the dyes have in general good fastness properties and in particular a hue in the orange region. It has been found that the novel dyes defined below largely achieve the object.

Accordingly, the invention relates to reactive dyes of the formula

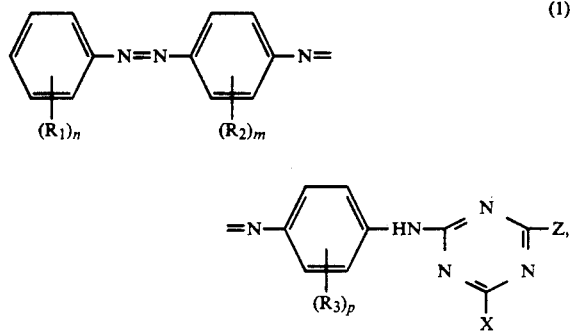

(1)

in which $R_1$, $R_2$ and $R_3$, independently of one another, are $C_1$-$C_4$alkyl, $C_1$-$C_4$alkoxy, halogen, ureido, $C_1$-$C_4$acylamino, carboxyl and sulfo and n, m and p, independently of one another, are the number 0, 1, 2 or 3, X is fluorine or chlorine and Z is an aliphatic, araliphatic, aromatic or heterocyclic amino group free from fibre-reactive radicals; or Z is the radical of an aliphatic or aromatic diamine which contains the radical of the formula

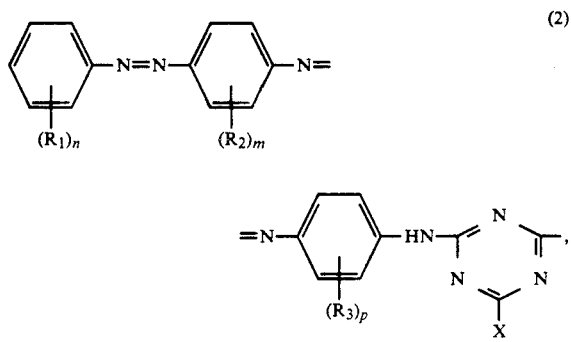

(2)

in which $R_1$, $R_2$, $R_3$, n, m, p and X are as defined, bound via the second amino group; or Z is a radical of the formula

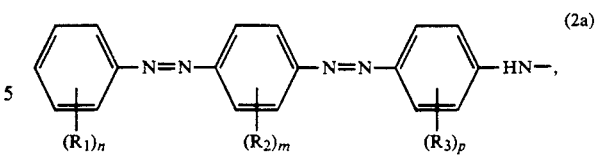

(2a)

in which $R_1$, $R_2$, $R_3$, n, m, and p are as defined; or Z is a radical —NH—SO$_2$—(CH$_2$)$_2$—OSO$_3$H; and the reactive dye of the formula (1) contains at least two sulfo groups; and mixtures of the reactive dyes of the formula (1).

Examples of suitable amino groups Z are: alkylamino, N,N-dialkylamino, cycloalkylamino, N,N-dicycloalkylamino, aralkylamino, arylamino groups, mixed substituted amino groups, such as N-alkyl-N-cyclohexylamino and N-alkyl-N-arylamino groups, furthermore amino groups containing heterocyclic radicals, which may contain further fused-on carbocyclic rings, and amino groups in which the amino nitrogen atom is a member of an N-heterocyclic ring, which may contain further hetero atoms. The abovementioned alkyl radicals can be straight-chain or branched, have low molecular weight or high molecular weight, preference being given to alkyl radicals having 1 to 6 carbon atoms; suitable cycloalkyl, aralkyl and aryl radicals are in particular cyclohexyl, benzyl, phenethyl, phenyl and naphthyl radicals; heterocyclic radicals are especially furan, thiophene, pyrazole, pyridine, pyrimidine, quinoline, benzimidazole, benzothiazole and benzoxazole radicals; and suitable amino groups in which the amino nitrogen atom is a member of an N-heterocyclic ring are preferably radicals of six-membered N-heterocyclic compounds, which may contain nitrogen, oxygen and sulfur as further hetero atoms. The abovementioned alkyl, cycloalkyl, aralkyl and aryl radicals, the heterocyclic radicals and the N-heterocyclic rings can be further substituted, for example, by halogen, such as fluorine, chlorine and bromine, nitro, cyano, trifluoromethyl, sulfamoyl, carbamoyl, $C_1$-$C_4$alkyl, $C_1$-$C_4$alkoxy, acylamino groups, such as acetylamino, ureido, hydroxyl, carboxyl, sulfomethyl and sulfo.

Examples of the radical Z in formula (1) are: -NH$_2$, methylamino, ethylamino, propylamino, isopropylamino, butylamino, β-(acetylamino)ethylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, N-methyl-N-phenylamino, N-ethyl-N-phenylamino, N-propyl-N-phenylamino, N-butyl-N-phenylamino, N-β-cyanoethyl-N-phenylamino, N-ethyl-2-methylphenylamino, N-ethyl-4-methylphenylamino, N-ethyl-3-sulfophenylamino, N-ethyl-4-sulfophenylamino, phenylamino, toluidino, xylidino, chloroanilino, anisidino, phenetidino, 2-, 3- and 4-sulfoanilino, 2,5-disulfoanilino, sulfomethylanilino, N-sulfomethylanilino, 3- and 4-carboxyphenylamino, 2-carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 6-sulfonaphth-2-ylamino, pyrid-2-ylamino, morpholino, piperidino and piperazino.

Further suitable radicals Z are aliphatic or aromatic diamines, for example H$_2$N—A—NH$_2$, in which A is C$_2$-C$_6$alkylene, phenylene or sulfophenylene, the radical of the formula (2) being bound to the second amino group.

Reactive dyes having a diamine as radical Z have the formula

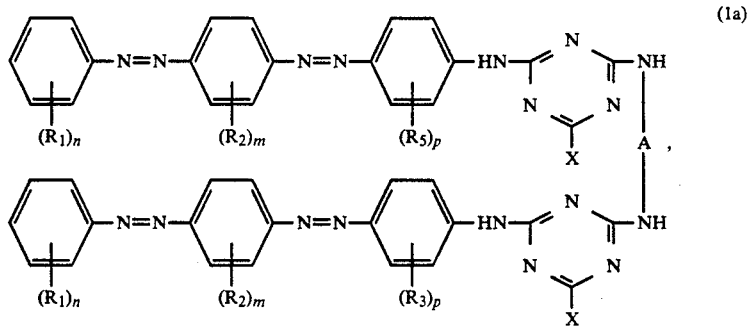

in which R$_1$, R$_2$, R$_3$, n, m, p, X and A are as defined.

Reactive dyes of the formula (1) in which Z is a radical of the formula (2a) are those of the formula

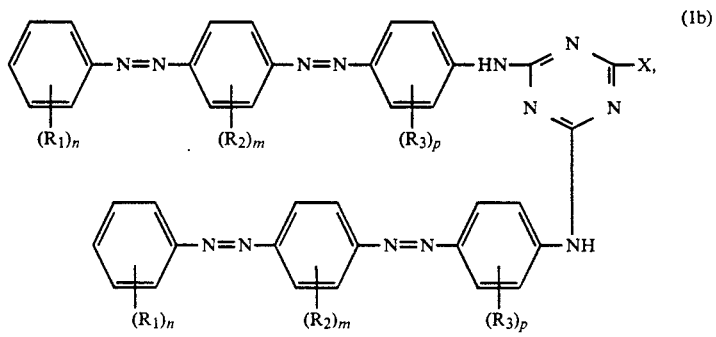

in which R$_1$, R$_2$, R$_3$, n, m, p and X are as defined.

Reactive dyes of the formula (1) in which Z is a radical -SO$_2$-(CH$_2$)$_2$-OSO$_3$H are those of the formula

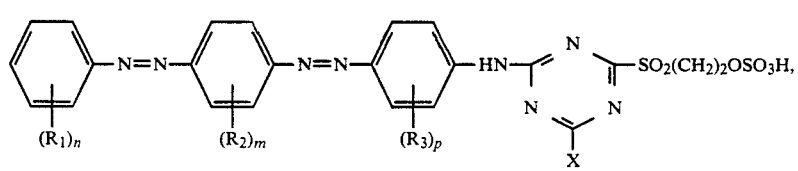

in which R$_1$, R$_2$, R$_3$, n, m, p and X are as defined.

Suitable C$_1$-C$_4$alkyl radicals R$_1$, R$_2$ and R$_3$ are, independently of one another, methyl, ethyl, n-propyl, isopropyl, n-butyl, isobutyl, sec-butyl or tert-butyl. Ethyl and in particular methyl are preferred.

Suitable C$_1$-C$_4$alkoxy radicals R$_1$, R$_2$ and R$_3$ are, independently of one another, methoxy, ethoxy, n-propoxy, isopropoxy, n-butoxy, isobutoxy, sec-butoxy or tert-butoxy. Ethoxy and in particular methoxy are preferred.

Examples of suitable C$_1$-C$_4$acylamino radicals R$_1$, R$_2$ and R$_3$ are, independently of one another, formyl, acetyl or propionylamino. Preference is given in particular to acetylamino.

Suitable halogens R$_1$, R$_2$ and R$_3$ are, independently of one another, fluorine, bromine and in particular chlorine.

Preference is given to reactive dyes of the formula (1) in which R$_1$, R$_2$ and R$_3$, independently of one another, are methyl, ethyl, methoxy, ethoxy, ureido, acetylamino, chlorine, carboxyl or sulfo.

Further preference is given to reactive dyes of the formula (1) in which Z is an aromatic amino group, in particular a sulfo- or disulfophenylamino group; preferably to those in which R$_1$, R$_2$ and R$_3$, independently of one another, are methyl, ethyl, methoxy, ethoxy, ureido, acetylamino or sulfo and in which Z is an aromatic amino group, in particular a sulfo- or disulfophenylamino group.

Particular preference is given to reactive dyes of the formula

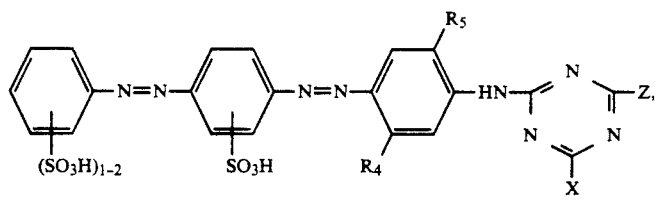

in which $R_4$ is hydrogen, methyl, methoxy, ureido or acetylamino, $R_5$ is hydrogen, methyl or methoxy and X and Z is as defined in formula (1).

Very particular preference is given to reactive dyes of the formulae

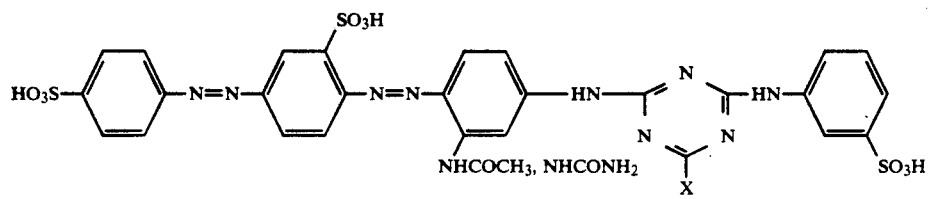

and

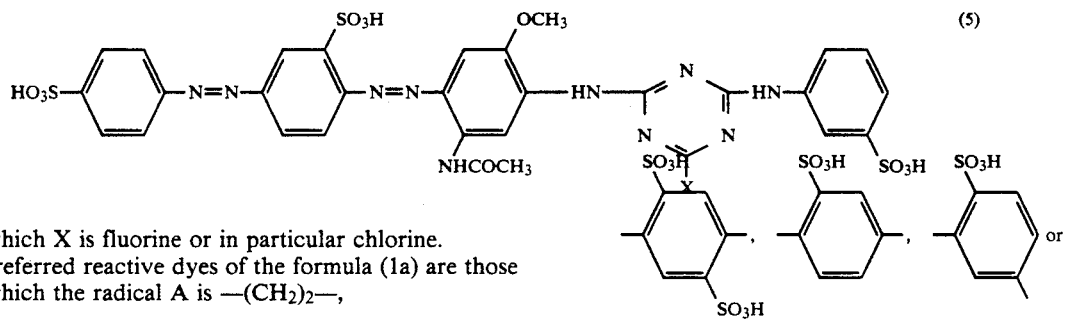

in which X is fluorine or in particular chlorine.

Preferred reactive dyes of the formula (1a) are those in which the radical A is —(CH$_2$)$_2$—,

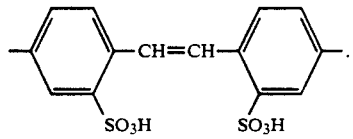

-continued

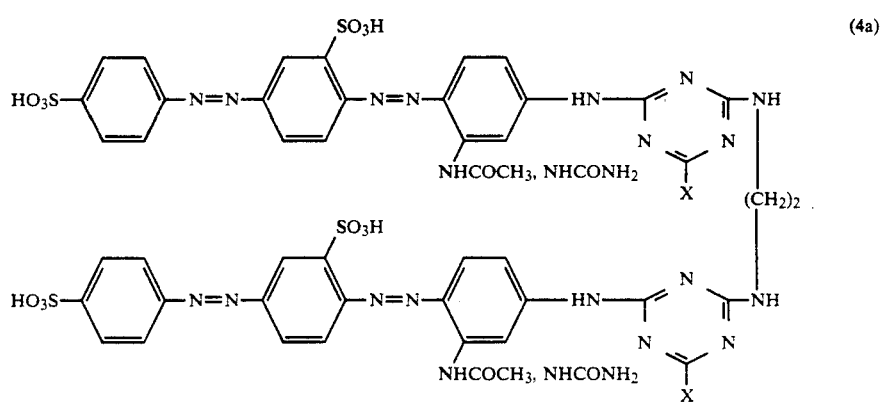

Particular preference is given to reactive dyes of the formulae

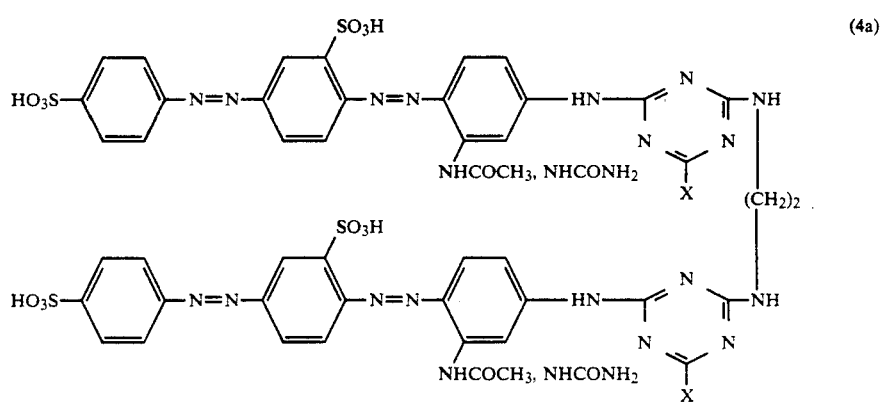

or

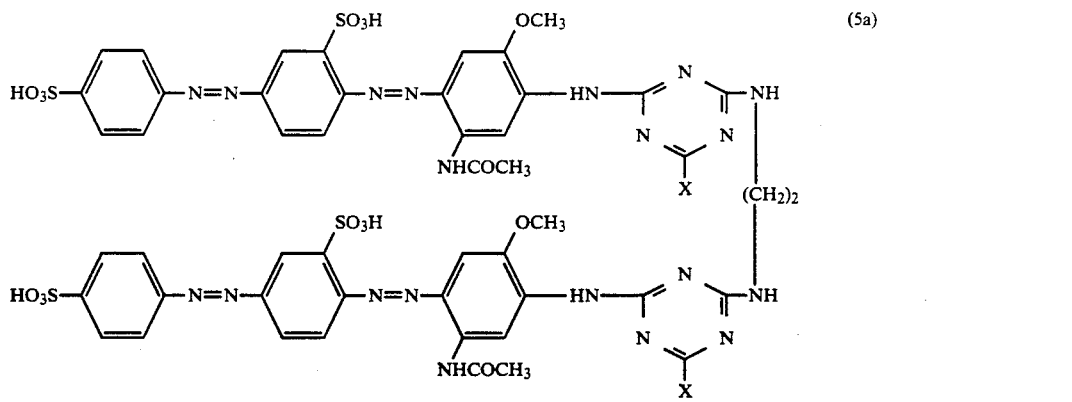

in which X is fluorine or in particular chlorine.

Very particular preference is given to reactive dyes, in which X is chlorine.

The preparation of the reactive dyes of the formula (1) comprises condensing an aminodisazo compound of the formula

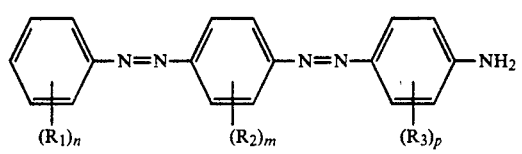

with a triazine of the formula

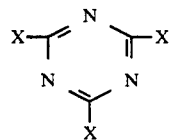

and an amine of the formula

H—Z (8)

with one another in any desired order, $R_1$, $R_2$, $R_3$, n, m, p, X and Z being as defined in formula (1).

In the case where H—Z is a diamine containing the radical of the formula (2) in bound form, these reactive dyes of the formula (1) are prepared such that at least two times the molar amount of the aminodisazo compound of the formula (6) and two times the molar amount of triazine of the formula (7), relative to the molar amount of diamine of the formula (8), are used.

In the case where Z is a radical of the formula (2a), these reactive dyes of the formula (1) are prepared such that at least two times the molar amount of aminodisazo compound of the formula (6), relative to the molar amount of triazine of the formula (7), is used.

In the case where Z is a radical —NH—SO$_2$—(CH$_2$-)$_2$—OSO$_3$H, these reactive dyes of the formula (1) are prepared in a known manner.

Since the individual abovementioned process steps can be carried out in a different order, some of them, if desired, even simultaneously, various process variants are possible. In general, the reaction is carried out stepwise in succession, the order of the simple reactions between the individual reaction components advantageously depending on the specific conditions.

One embodiment of the process according to the invention comprises condensing an aminodisazo compound of the formula (6) with a triazine of the formula (7) and condensing the primary condensation product obtained with an amine of the formula (8).

A further embodiment of the process according to the invention comprises condensing an aminodisazo compound of the formula (6) with a primary condensation product of a triazine of the formula (7) and an amine of the formula (8).

Suitable starting materials which can be used for preparing the reactive dyes of the formula (1) are:

Aminodisazo compounds of the formula (6):

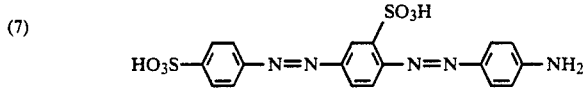

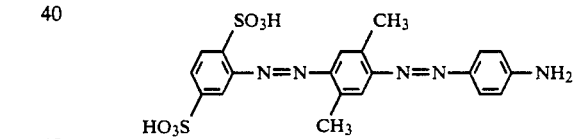

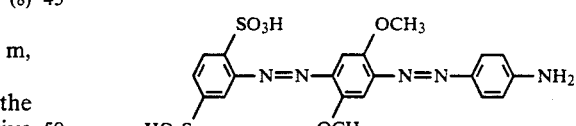

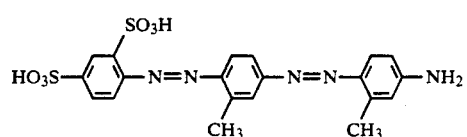

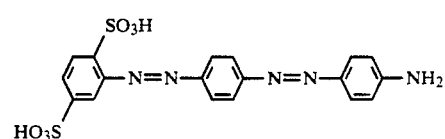

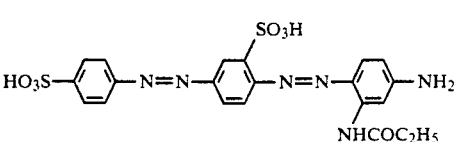

-continued
Aminodisazo compounds of the formula (6):

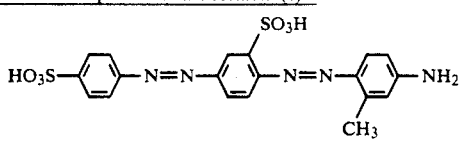
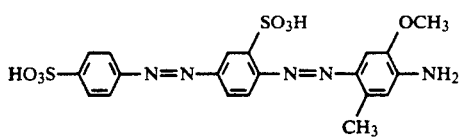
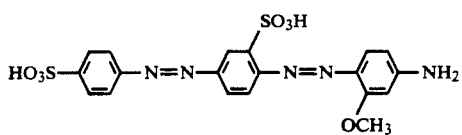
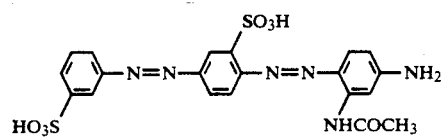
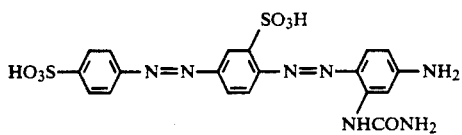
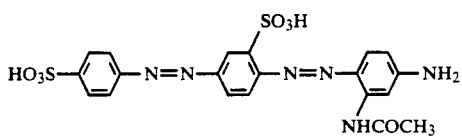
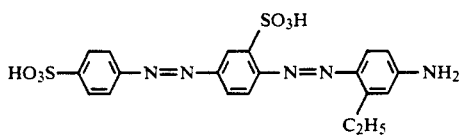
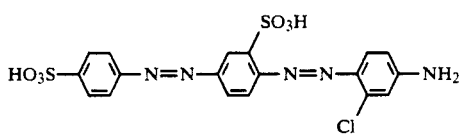
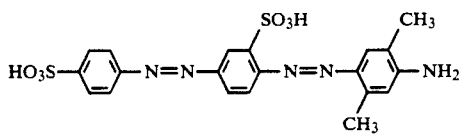
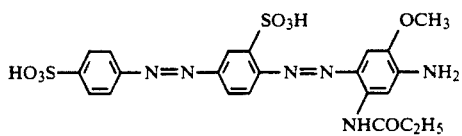
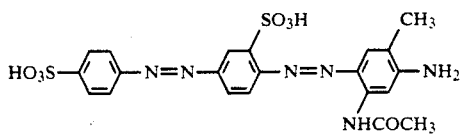

-continued
Aminodisazo compounds of the formula (6):

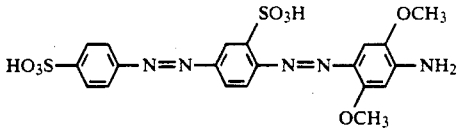
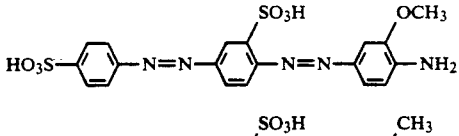
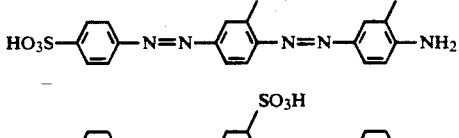
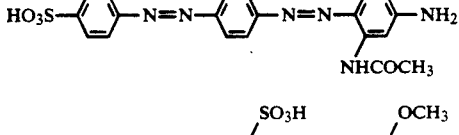
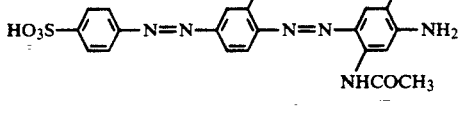

2,4,6-Trichloro-s-triazine or 2,4,6-trifluoro-s-triazine

Amines of the formula (8)

Ammonia, methylamine, dimethylamine, ethylamine, diethylamine, propylamine, isopropylamine, butylamine, dibutylamine, isobutylamine, sec-butylamine, tert-butylamine, hexylamine, methoxyethylamine, ethoxyethylamine, methoxypropylamine, chloroethylamine, hydroxyethylamine, dihydroxyethylamine, hydroxypropylamine, aminoethanesulfonic acid, β-(acetylamino)ethylamine, benzylamine, phenethylamine, cyclohexylamine, N-propylaminobenzene, N-isopropylaminobenzene, N-butylaminobenzene, N-isobutylaminobenzene, N-sec-butylaminobenzene, N-hexylaminobenzene, N-β-hydroxyethylaminobenzene, N-β-chloroethylaminobenzene, N-β-cyanoethylaminobenzene, N-β-sulfoethylaminobenzene, 1-(N-ethylamino)-2-, 3- or 4-methylbenzene, 1-(N-ethylamino)-2-, -3- or -4-ethylbenzene, 1-(N-ethylamino)-2-, -3- or -4-chlorobenzene, 1-N-ethylaminobenzene-3- or -4-sulfonic acid, 1-(N-ethylamino)-4-butylbenzene, N-n-butylamino-3-methylbenzene, 1-(N-ethylamino)-4-fluorobenzene, aniline, o-, m- and p-toluidine, 2,3-, 2,4-, 2,5-, 2,6-, 3,4- and 3,5-dimethylaniline, o-, m- and p-chloroaniline, N-methylaniline, N-ethylaniline, 3- or 4-acetylaminoaniline, 2,5-dimethoxyaniline, o-, m- and p-anisidine, o-, m- and p-phenetidine, 2-methoxy-5-methylaniline, 2-ethoxy-5-methoxyaniline, 4-bromoaniline, and 4-aminophenylurea, 1-naphthylamine, 2-naphthylamine, orthanilic acid, metanilic acid, sulfanilic acid, aniline-2,4-disulfonic acid, aniline-2,5-disulfonic acid, aniline-3,5-disulfonic acid, anthranilic acid, m- and p-aminobenzoic acid, 4-aminophenylmethanesulfonic acid, aniline-N-methanesulfonic acid, 2-aminotoluene-4-sulfonic acid, 2-aminotoluene-5-sulfonic acid, p-aminosalicylic acid, 1-amino-4-carboxybenzene-3-sulfonic acid, 1-amino-2-carboxybenzene-5-sulfonic acid, 1-amino-5-carboxybenzene-2-sulfonic acid, 1-naphthylamine-2-, -3-, -4-, -5-, -6-, -7- and -8-sulfonic acid, 2-naphthylamino-1-, -3-, -4-, -5-, -6-, -7- and -8-sulfonic acid, 1-naphthylamine-2,4-, -2,5-, -2,7-, -2,8-, -3,5-, -3,6-, -3,7-, -3,8-, -4,6-, -4,7-, -4,8- and -5,8-disulfonic acid, 2-naphthylamine-1,5-, -1,6-, -1,7-, -3,6-, -3,7-, -4,7-, -4,8-, -5,7- und -6,8-disulfonic acid, 1-naphthylamine-2,4,6-, -2,4,7-, -2,5,7-, -3,5,7-, -3,6,8- and -4,6,8-trisulfonic acid, 2-naphthylamine-1,3,7-, -1,5,7-, -3,5,7-, -3,6,7-, -3,6,8- and -4,6,8-trisulfonic acid, 2-, 3-and 4-aminopyridine, 2-aminobenzothiazole, 5-, 6- and 8-aminoquinoline, 2-aminopyrimidine, morpholine, piperidine, piperazine.

Diamines of the formula (8)

1,3-Propylenediamine, 1,2-propylenediamine, n-butylenediamine, 1-methyl-n-propylenediamine, n-hexylenediamine, 2-ethyl-n-butylenediamine, 2-hydroxy-n-propylenediamine, 1,3-diaminobenzene, 1,4-diaminobenzene, 1,3-diamino-4-chlorobenzene, 1,3-diamino-4-methylbenzene, 1,3-diamino-4-ethylbenzene, 1,3-diamino-4-methoxybenzene, 1,3-diamino-4-ethoxybenzene, 1,4-diamino-2-methylbenzene, 1,4-diamino-2-methoxybenzene, 1,4-diamino-2-ethoxybenzene, 1,4-diamino-2-chlorobenzene, 1,4-diamino-2,5-dimethylbenzene, 1,4-diamino-2,5-diethylbenzene, 1,4-diamino-2-methyl-5-methoxybenzene, 1,4-diamino-2,5-dimethoxybenzene, 1,4-diamino-2,5-diethoxybenzene, 2,6-diaminonaphthalene, 1,3-diamino-2,4,6-trimethylbenzene, 1,4-diamino-2,3,5,6-tetramethylbenzene, 1,3-diamino-4-nitrobenzene, 4,4'-diaminostilbene, 4,4'-diaminodiphenylmethane, 4,4'-diaminobiphenyl (benzidine), 3,3'-dimethylbenzidine, 3,3'-dimethoxybenzidine, 3,3'-dichlorobenzidine, 3,3'-dicarboxybenzidine, 3,3'-dicarboxymethoxybenzidine, 2,2'-dimethylbenzidine, 4,2'-diaminodiphenyl (diphenyline), 2,6-diaminonaphthalene-4,8-disulfonic acid, 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 1,4-diaminobenzene-2-carboxylic acid, 1,3-diaminobenzene-4-carboxylic acid, 1,2-diaminobenzene-4-carboxylic acid, 1,3-diaminobenzene-5-carboxylic acid, 1,4-diamino-2-methylbenzene, 4,4'-diaminodiphenyl ether, 2,2'-disulfo-4,4'-diaminodiphenylurea, ethylenebis(4-aminobenzene-2-sulfonic acid), 2,2'-disulfo-4,4'-diaminostilbene, 2,2'-disulfo-4,4'-diaminodiphenylethane, piperazine.

The preparation of the disazo compounds of the formula (6) is known per se or is carried out in analogy to known diazotisation and coupling processes.

Diazotisation of the diazo components usually takes place by reaction with nitrous acid in aqueous mineral acid solution at low temperature, and the coupling onto the coupling component at weakly acidic, neutral to weakly alkaline pH values.

The condensations of the 2,4,6-trichloro- or 2,4,6-trifluoro-s-triazine of the formula (7) with the aminodisazo compounds and the amino compounds of the formula (4) preferably take place in aqueous solution or suspension, and low temperature, and at a weakly acidic, neutral to weakly alkaline pH, so that in the finished reactive dye of the formula (1) a chlorine or fluorine atom still remains as detachable radical. Advantageously, the hydrogen chloride or fluoride released in the condensation is continuously neutralised by addition of aqueous alkali metal hydroxides, alkali metal carbonates or alkali metal bicarbonates. Isolation of the dichloro- or difluorotriazineazo compound is in general omitted.

The reactive dyes of the formula (1) can be isolated and processed to give useful, dry dye compounds. Isolation preferably takes place at the lowest possible temperatures by salting out and filtration. The filtered dyes can, if appropriate after addition of diluents and/or buffers, for example after addition of a mixture of equal parts of monosodium phosphate and disodium phosphate, be dried; preferably, drying is carried out at moderately high temperatures and under reduced pressure. By spray-drying the entire preparation mixture, it is in certain cases possible to prepare the dry compounds according to the invention directly, i.e. without intermediate isolation of the dyes.

Of interest are furthermore concentrated liquid dye preparations of the reactive dyes of the formula (1) which are stable on storage and their use for the preparation of padding liquors, dye baths and in particular printing pastes, which are used for the dyeing and printing of fibre materials, in particular of cellulose-containing fibre materials. Liquid dye preparations have advantages over the pulverulent form, for example no dusting when the printing pastes and the padding and dyeing liquors are prepared, no wetting problems due to agglomeration, no specky dyeings due to undissolved dye particles. Liquid formulations of this type should be highly concentrated (at least 10% by weight and preferably more than 15% by weight of dye content) and storable in a wide temperature range (−10° to +40° C.) for at least several months without undergoing any change.

The aqueous solution or suspension possibly containing solvents and obtained directly from the synthesis or an aqueous slurry of the moist press or filter cake of the crude dye having varying contents of undesirable dissolved substances of low molecular weight, in particular of by-products formed in the synthesis of the dye and dissolved inorganic and organic salts, can be used as the starting solution or suspension for preparing the dye preparations. In cases where the condensation product cannot be salted out or only with extreme difficulty, it is also possible to use the crude condensation or neutralisation solution directly. Advantageously, starting solutions or suspensions containing 2 to 50% of dye are used.

However, it is also possible to use the dry crude dye powder as the starting material by first making it into a slurry using water.

The concentrated liquid preparations are usually true or colloidal solutions. They are thin liquids (viscosity of about 5 to 300 cp/20° C.) and have a long shelf life, i.e. they remain in a usable state for at least several months at temperatures of −20° to +60° C., in particular −10° to +40° C. When padding liquors, dye baths and printing pastes are prepared not only water but also organic solvents and/or thickeners can be added to these preparations without precipitation of the dye or any other inhomogeneities taking place. The padding liquors, dye baths and printing pastes mentioned can be used, for example, for dyeing or printing textile materials made of natural or synthetic, in particular cellulose-containing, fibre materials in a known manner.

The liquid dye preparations preferably contain 20 to 50% by weight, in particular 35 to 45% by weight, of the dye of the formula (1).

The stable concentrated liquid dye preparations are particularly suitable for the production of printing pastes for printing cellulose fibre materials and for continuous dyeing processes.

A process for the preparation of a liquid preparation according to the invention is disclosed, for example, in EP-A-0 333 656, in which the dye solution is desalted and concentrated in a reverse osmosis plant.

The application of membrane-bound filtration techniques for the production of water-soluble organic dye preparations is known. The process starts from the aqueous suspension of the crude dye, which is substantially freed from by-products soluble in water and the salt content of which is reduced to about half by means a first membrane separation process; this is followed by a second membrane separation process.

Thus, in this first membrane separation process, the soluble by-products and a portion of the salts permeate through a membrane, while the dye and portions which are insoluble in water are retained.

In the second membrane separation process, the dye suspension, if appropriate after dilution with water, is desalted and concentrated and finally converted into liquid or solid dye preparation ready for sale.

The dye solutions used usually have a dye content of 5 to 20% by weight and a salt content (inorganic salts) of 1 to 20% by weight, in particular 1 to 10% by weight. The pH is usually in the range from 3 to 10, preferably 3 to 9. Insoluble portions are separated off by microfiltration, and concentrating and desalting are continued until a dye content of 10 to 50% by weight has been reached. This lowers the salt content below 5% by weight, for example 0.05 to 5% by weight, and preferably below 1% by weight, for example 0.05 to 1% by weight.

In order to prepare a commercial liquid form, the concentrated aqueous dye preparation, if appropriate after addition of components customary for liquid formulations, such as solubilising agents, antifoams, antifreeze, humectants, surfactants, buffer substances and/or antimicrobial agents and after adjusting the pH, only needs to be brought to a predetermined final dye content by dilution and/or by means of diluents. However, the dye preparation can also be converted, if appropriate after addition of additives, such as binders, dedusting agents, wetting agents, buffer substances, such as alkali metal polyphosphates, disodium hydrogen phosphate, citric acid and/or ethylenediaminetetraacetic acid, and/or diluents, into a solid dye compound by removal of water. Owing to the increased dye concentration, less energy for drying is required. Conventional drying processes are used, in particular spray-drying.

The pH of the commercial liquid formulation of the reactive dyes is usually adjusted by adding buffer substances. The pH is for example in the range from 7.0 to 8.5, preferably 8.0.

The auxiliaries or additives mentioned can of course be added to the dye solution not only before its final formulation as commercial form but incorporated in the solution of the crude dye even before or during the process according to the invention and thus at least a portion of them is already present in the dye solution from which the final commercial dye formulation is prepared (for example solubilising agents, solvents, surfactants, and the like). Of course, it only makes sense to add the auxiliaries or additives during the process if they will not be removed completely from the solution again by one of the membrane separation processes.

The concentrated liquid preparations of the reactive dyes of the formula (1) thus contain 10 to 50 percent by weight of dye, 0.05 to 5 percent by weight of an inorganic salt, for example NaCl, KCl, LiCl, and such an amount of buffer substances, for example of monosodium phosphate and disodium phosphate or sodium tripolyphosphate or mixtures of buffer substances, that a pH of between 7.8 and 8.5 can be reached, and water.

The reactive dyes of the formula (1) are distinguished by high reactivity and they produce dyeings having good wet and light fastness properties. It may be pointed out in particular that the dyes have good solubility and high fixation of the dye, that they diffuse readily into the cellulose fibre and that the unfixed portion can be easily removed.

The dyes according to the invention of the formula (1) are present either in the form of their free acid or, preferably, as salts thereof. Examples of suitable salts are alkali metal salts, alkaline earth metal salts or ammonium salts or the salts of an organic amine. Examples are sodium salts, lithium salts, potassium salts or ammonium salts or the salt of triethanolamine.

The reactive dyes of the forumla (1) are suitable for the dyeing and printing of a wide range of materials, such as silk, leather, wool, polyamide fibres and polyurethanes, but in particular of cellulose-containing materials of fibre structure, such as linen, cellulose, regenerated cellulose and in particular cotton. They are suitable not only for the exhaust method but also for dyeing by the pad-dyeing process, in which the material to be dyed is impregnated with aqueous dye solutions which, if desired, may also contain salts, and the dyes are fixed after an alkaline treatment or in the presence of alkali, if appropriate with exposure to heat.

They are suitable in particular for the printing of textile cellulose-containing fibre materials, in particular cotton, but also for the printing of nitrogen-containing fibres, for example wool, silk or wool-containing blended fabrics. They are suitable in particular for mild printing processes, for example those in which sodium propionate is used as fixing alkali.

It is recommended to subject the dyeings and prints to thorough rinsing using cold and hot water, if appropriate with the addition of an agent acting as a dispersant and promoting the diffusion of the unfixed portion.

In practical application, the dyes according to the invention are advantageously used as liquid dyeing or printing preparations.

The preparation of the monoazo intermediates is not described in all cases in the exemplary embodiments which follow, but it is clearly obvious from what has been said above.

In the examples which follow, parts are by weight. Temperatures are degrees centigrade, parts by weight relate to parts by volume as the gram relates to the cubic centimeter.

EXAMPLE 1

35.7 parts of 4-aminoazobenzene-3,4'-disulfonic acid of the formula

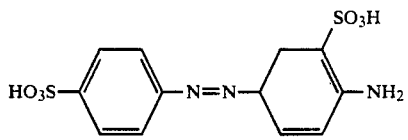

C. while the pH is maintained between 6 and 7 using aqueous sodium carbonate solution.

After the reaction has ended, the reactive dye is precipitated by addition of NaCl, isolated and dried in vacuo. In the form of the free acid, the reactive dye obtained has the formula

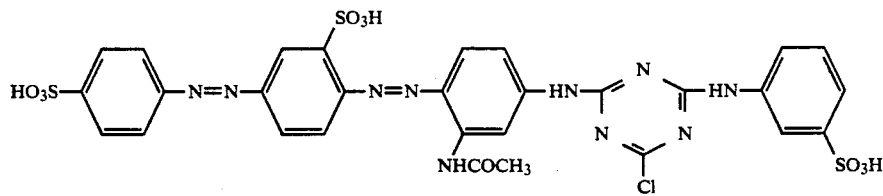

(100) [$\lambda_{max}$ 412 nm]

are dissolved in 500 parts of water. 24 parts of 30% sodium nitrite solution are added, and the solution is poured into a mixture of 33 parts of 30% hydrochloric acid and 33 parts of crushed ice. 15 parts of 1-amino-3-acetylaminobenzene are slowly added dropwise to the diazo solution thus obtained. The pH is maintained between 2 and 3 using dilute sodium hydroxide solution until the coupling reaction is complete.

It dyes cotton from an aqueous liquor in orange hues having good fastness properties.

EXAMPLE 2

The procedure of Example 1 is repeated, except that 24 parts of 1-amino-3-acetylamino-6-methoxybenzene are used instead of 15 parts of 1-amino-3-acetylaminobenzene, giving a reactive dye which, in the form of the free acid, has the formula

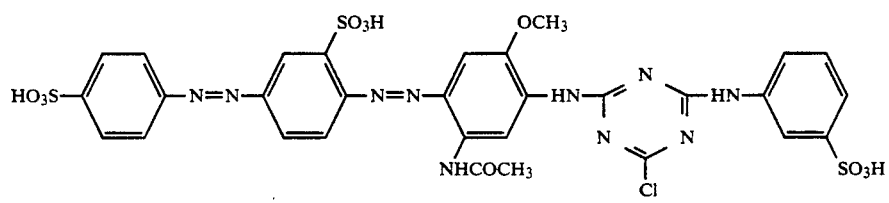

(101) [$\lambda_{max}$ 439 nm]

The disazo compound, a portion of which has precipitated, is dissolved under neutral conditions using a small amount of sodium hydroxide solution. Furthermore, 20 parts of aminobenzene-3-sulfonic acid are dissolved in 400 parts of water under neutral conditions with the addition of sodium carbonate. At 0°, 20.5 parts of cyanuric chloride are rapidly added dropwise with vigorous stirring. The pH is maintained between 5 and 6.5 by simultaneous addition of aqueous sodium carbonate solution. After the reaction is complete, a suspension is present into which the neutral solution of the disazo compound described above is slowly poured. The temperature of the reaction mixture increases to about 40°

EXAMPLE 3

The procedure of Example 2 is repeated, except that 15 parts of taurine are used instead of 20 parts of aminobenzene-3-sulfonic acid, giving a reactive dye which, in the form of the free acid, has the formula

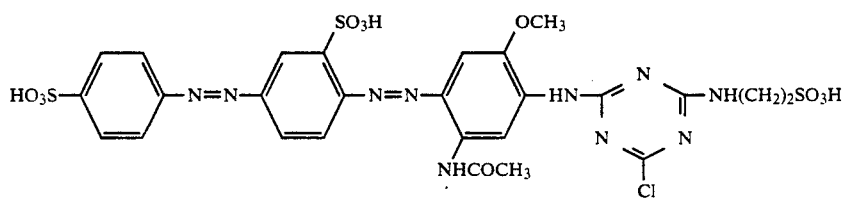

(102) [$\lambda_{max}$ 438 nm]

EXAMPLES 4-6

Examples 1 to 3 are repeated, using an equivalent amount of cyanuric fluoride instead of cyanuric chloride for preparing the compounds (100), (101) or (102), giving the reactive dyes of the formulae

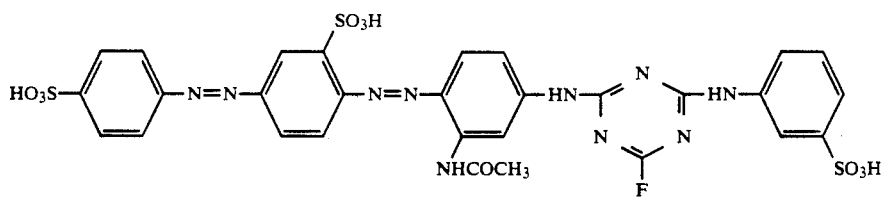

(103) [$\lambda_{max}$ 412 nm]

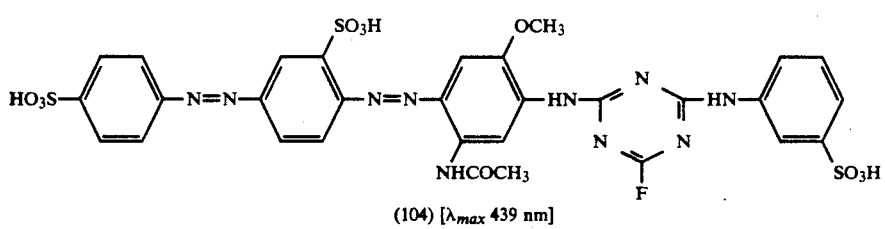

(104) [$\lambda_{max}$ 439 nm]

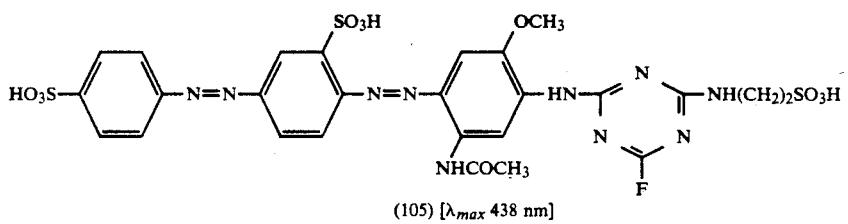

(105) [$\lambda_{max}$ 438 nm]

which dye cotton in orange hues having good fastness properties.

EXAMPLES 7-59

Example 7a

Example 1 is repeated, using an equivalent amount of ammonia instead of aminobenzene-3-sulfonic acid for preparing the compound (100), likewise giving a valuable reactive dye.

Example 7b

Example 2 is repeated, using an equivalent amount of ammonia instead of aminobenzene-3-sulfonic acid for preparing the compound (101), likewise giving a valuable reactive dye.

Example 7c

Example 4 is repeated, using an equivalent amount of ammonia instead of aminobenzene-3-sulfonic acid for preparing the compound (103), likewise giving a valuable reactive dye.

Example 7d

Example 5 is repeated, using an equivalent amount of ammonia instead of aminobenzene-3-sulfonic acid for preparing the compound (104), likewise giving a valuable reactive dye.

The above Examples 7a-7d are repeated, using one of the following amines instead of the ammonia, likewise giving reactive dyes (Examples 8a-59d) which dye cellulose-containing fibre materials in orange to brown hues:

| Example | Amines |
|---|---|
| 8 | Methylamine |
| 9 | Ethylamine |
| 10 | n-Propylamine |
| 11 | n-Butylamine |
| 12 | Dimethylamine |
| 13 | Diethylamine |
| 14 | Ethanolamine |
| 15 | Diethanolamine |
| 16 | β-Sulfatoethylamine |
| 17 | Taurine |
| 18 | Aniline |
| 19 | N-Methylaniline |
| 20 | N-Ethylaniline |
| 21 | o-Toluidine |
| 22 | m-Toluidine |
| 23 | p-Toluidine |
| 24 | m-Chloroaniline |
| 25 | p-Chloraniline |
| 26 | o-Anisidine |
| 27 | p-Anisidine |
| 28 | p-Phenetidine |
| 29 | p-Aminobenzoic acid |
| 30 | Aniline-2-sulfonic acid |
| 31 | 4-Aminoacetanilide |
| 32 | 3-Aminophenylurea |
| 33 | 4-Aminophenylurea |
| 34 | Anthranilic acid |
| 35 | m-Aminobenzoic acid |
| 36 | Morpholine |
| 37 | 2-Naphthylamine-6-sulfonic acid |
| 38 | 4-Aminosalicylic acid |
| 39 | Orthanilic acid |
| 40 | Metanilic acid |
| 41 | Sulfanilic acid |
| 42 | Aniline-2,4-disulfonic acid |
| 43 | Aniline-3,5-disulfonic acid |
| 44 | 4-Methylaniline-2,5-disulfonic acid |
| 45 | 3-Methoxyaniline-2,5-disulfonic acid |
| 46 | 2-Naphthylamine-1-sulfonic acid |
| 47 | 2-Naphthylamine-1,5-disulfonic acid |
| 48 | 2-Naphthylamine-6,8-disulfonic acid |
| 49 | 2-Naphthylamine-4,8-disulfonic acid |
| 50 | 1-Naphthylamine-2,4,8-trisulfonic acid |
| 51 | 1-Naphthylamine-2,5,7-trisulfonic acid |
| 52 | 1-Naphthylamine-3,6,8-trisulfonic acid |
| 53 | 1-Naphthylamine-4,6,8-trisulfonic acid |
| 54 | 2-Naphthylamine-1,5,7-trisulfonic acid |
| 55 | 2-Naphthylamine-3,6,8-trisulfonic acid |
| 56 | 4-Methylaniline-2,5-disulfonic acid |
| 57 | 4-Methylaniline-3-sulfonic acid |

-continued

| Example | Amines |
|---------|--------|
| 58 | 4-Methoxyaniline-3-sulfonic acid |
| 59 | 4-Methoxyaniline-2,5-disulfonic acid |

EXAMPLES 60-78

The procedures of Examples 1 and 2 are repeated, using an equivalent amount of one of the following aminodisazo compounds instead of the aminodisazo compound mentioned there, likewise giving reactive dyes which dye cellulose-containing fibre materials in orange to brown hues having good fastness properties:

| Example | Compound | |
|---------|----------|---|
| 60 | HO$_3$S—C$_6$H$_4$—N=N—C$_6$H$_3$(SO$_3$H)—N=N—C$_6$H$_4$—NH$_2$ | (106) |
| 61 | (2,5-disulfophenyl)—N=N—(2,5-dimethylphenyl)—N=N—C$_6$H$_4$—NH$_2$ | (107) |
| 62 | (2,5-disulfophenyl)—N=N—(2,5-dimethoxyphenyl)—N=N—C$_6$H$_4$—NH$_2$ | (108) |
| 63 | (2,4-disulfophenyl)—N=N—(3-methylphenyl)—N=N—(3-methylphenyl)—NH$_2$ | (109) |
| 64 | (2,5-disulfophenyl)—N=N—C$_6$H$_4$—N=N—C$_6$H$_4$—NH$_2$ | (110) |
| 65 | HO$_3$S—C$_6$H$_4$—N=N—C$_6$H$_3$(SO$_3$H)—N=N—C$_6$H$_3$(NHCOC$_2$H$_5$)—NH$_2$ | (111) |
| 66 | HO$_3$S—C$_6$H$_4$—N=N—C$_6$H$_3$(SO$_3$H)—N=N—C$_6$H$_3$(CH$_3$)—NH$_2$ | (112) |

-continued

| Example | Structure | Compound |
|---|---|---|
| 67 | HO3S–C6H4–N=N–C6H3(SO3H)–N=N–C6H2(OCH3)(CH3)–NH2 | (113) |
| 68 | HO3S–C6H4–N=N–C6H3(SO3H)–N=N–C6H3(OCH3)–NH2 | (114) |
| 69 | 3-HO3S–C6H4–N=N–C6H3(SO3H)–N=N–C6H3(NHCOCH3)–NH2 | (115) |
| 70 | HO3S–C6H4–N=N–C6H3(SO3H)–N=N–C6H3(NHCONH2)–NH2 | (116) |
| 71 | HO3S–C6H4–N=N–C6H3(SO3H)–N=N–C6H3(C2H5)–NH2 | (117) |
| 72 | HO3S–C6H4–N=N–C6H3(SO3H)–N=N–C6H3(Cl)–NH2 | (118) |
| 73 | HO3S–C6H4–N=N–C6H3(SO3H)–N=N–C6H2(CH3)2–NH2 | (119) |
| 74 | HO3S–C6H4–N=N–C6H3(SO3H)–N=N–C6H2(OCH3)(NHCOC2H5)–NH2 | (120) |
| 75 | HO3S–C6H4–N=N–C6H3(SO3H)–N=N–C6H2(CH3)(NHCOCH3)–NH2 | (121) |

| Example | Compound |
|---|---|
| 76 | (122) |
| 77 | (123) |
| 78 | (124) |
EXAMPLES 80-83
Examples 1, 2, 4 and 5 are repeated, using a half-equivalent amount of diethyldiamine instead of aminobenzene-3-sulfonic acid for preparing the compounds (100), (101), (103) or (104), giving the reactive dyes of the formulae
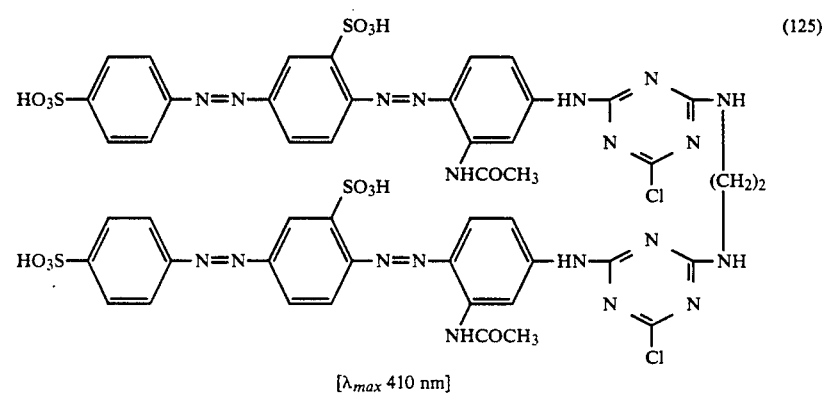
(125)
[$\lambda_{max}$ 410 nm]
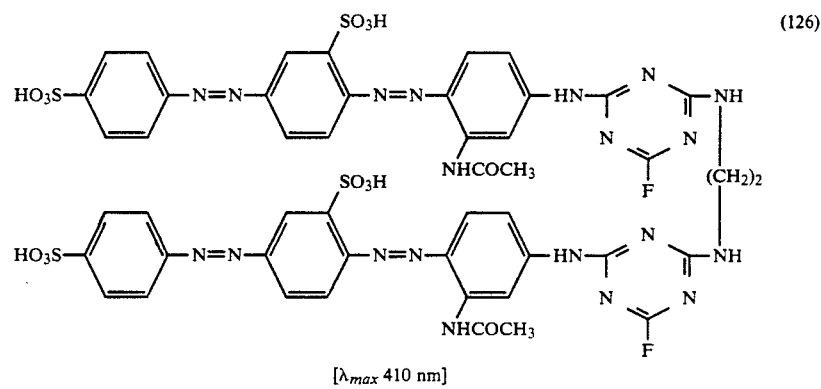
(126)
[$\lambda_{max}$ 410 nm]

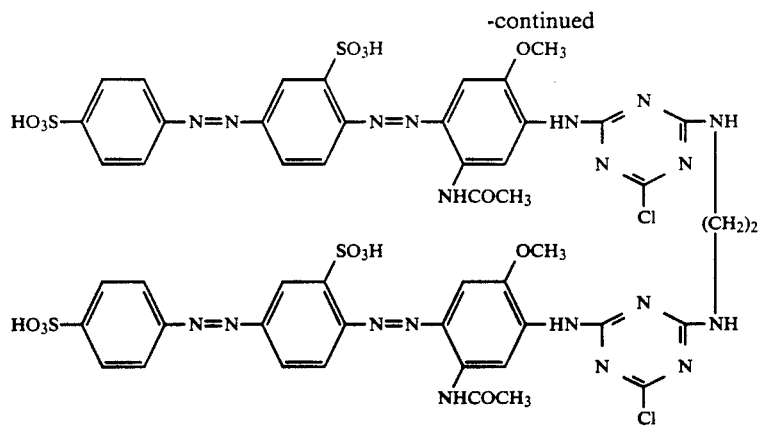
[λ_max 438 nm] (127)
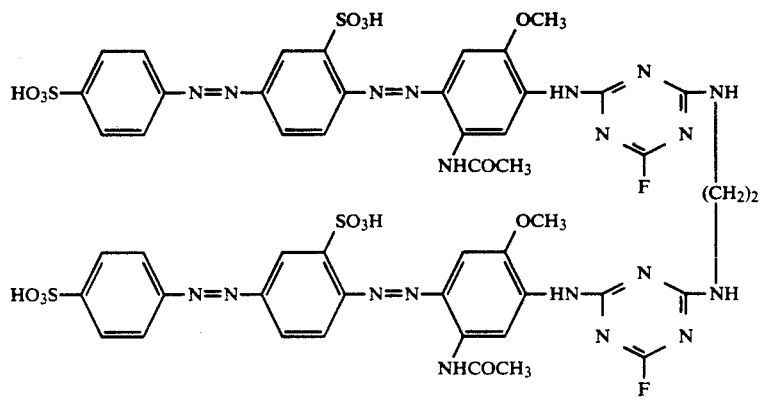
[λ_max 438 nm] (128)
EXAMPLES 84 AND 85
Examples 1 and 4 are repeated, using an equivalent amount of 1-amino-3-ureidoaminobenzene instead of the 1-amino-3-acetylaminobenzene for preparing the compounds (100) or (103) and a half-equivalent amount of diethyldiamine instead of the aminobenzene-3-sulfonic acid, giving the reactive dyes of the formulae
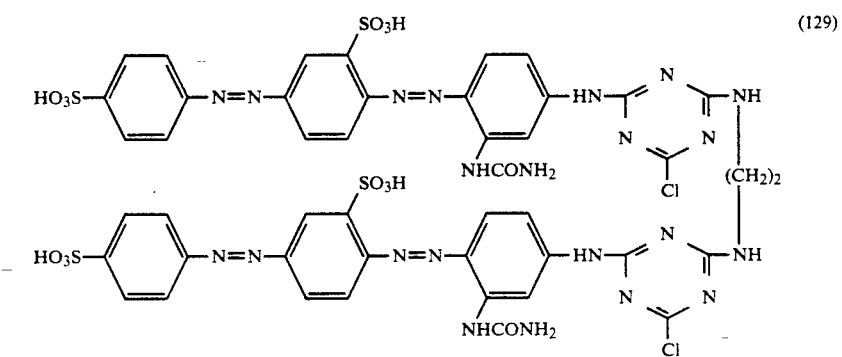
[λ_max 434 nm] (129)

-continued

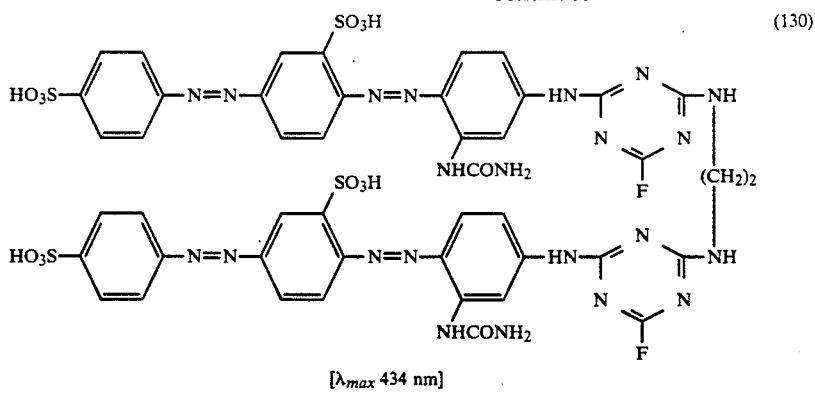

[$\lambda_{max}$ 434 nm]

DYEING PROCEDURE 1

2 parts of the dye obtained according to Example 1 are dissolved in 100 parts of water at 20° to 50° C. with the addition of 5 to 20 parts of urea and 2 parts of anhydrous Na$_2$CO$_3$. The solution obtained is used to impregnate a cotton fabric in such a manner that its liquor pickup is 60 to 80%, and the fabric is then dried. It is then thermofixed at 140° to 210° C. for 1½ to 5 minutes, then soaped in a 0.1% solution of an ion-free detergent at the boiling temperature for a quarter of an hour, rinsed and dried.

DYEING PROCEDURE 2

2 parts of the dye obtained according to Example 1 are dissolved in 2000 parts of water with the addition of 120 parts of NaCl or anhydrous Na$_2$SO$_4$ at 75° C. This dye bath is entered with 100 parts of a cotton fabric, and the temperature is kept constant for 30 to 60 minutes. 10 parts of anhydrous Na$_2$CO$_3$ and 4 ml of 36% sodium hydroxide solution are then added. The temperature is maintained at 75° to 80° C. for another 45 to 60 minutes, the fabric is then soaped in a 0.1% solution of an ion-free detergent at the boiling temperature for 15 minutes, rinsed and dried.

DYEING PROCEDURE 3

2 parts of the dye obtained according to Example 1 are dissolved in 100 parts of water with the addition of 0.5 part of sodium m-nitrobenzenesulfonate. The solution obtained is used to impregnate a cotton fabric in such a manner that its liquor pickup is 75%, and the fabric is then dried. It is then impregnated with a warm solution at 20° C. containing 5 g of sodium hydroxide and 300 g of sodium chloride per liter, squeezed off to a liquor pickup of 75%, subjected to steaming at 100° to 101° C. for 30 seconds, rinsed, soaped in a 0.3% solution of an ion-free detergent at the boiling temperature for a quarter of an hour, rinsed and dried.

DYEING PROCEDURE 4

2 parts of the dye obtained according to Example 1 are dissolved in 100 parts of water. The solution is poured into 1900 parts of cold water, 60 parts of sodium chloride are added, and this dye bath is entered with 100 parts of a cotton fabric. The temperature is increased to 60° C., 40 parts of anhydrous Na$_2$CO$_3$ and another 60 parts of sodium chloride being added after 30 minutes. The temperature is maintained at 60° C. for 30 minutes, the dyeing is rinsed and soaped in a 0.3% solution of an ion-free detergent at the boiling temperature for 15 minutes, rinsed and dried.

PRINTING PROCEDURE 1

2 parts of the dye prepared according to Example 1 are sprinkled into 100 parts of a stock thickener containing 45 parts of 5% sodium alginate thickener, 32 parts of water, 20 parts of urea, 1 part of sodium m-nitrobenzenesulfonate and 2 parts of sodium carbonate, with rapid stirring. The printing paste thus obtained is used to print a cotton fabric on a roller printing machine, and the printed material obtained is steamed in saturated steam at 100° C. for 4 to 8 minutes. The printed fabric is then thoroughly rinsed in cold and hot water, during which the portions which are not chemically fixed can be easily removed from the fibre, and the fabric is then dried.

PRINTING PROCEDURE 2

6 parts of the reactive dye of the formula (101) from Example 2 are sprinkled into 94 parts of a stock thickener containing 50 parts of 5 percent sodium alginate thickener, 39.4 parts of water, 3.5 parts of sodium propionate, 1 part of sodium m-nitrobenzenesulfonate and 0.1 part of 4 percent aqueous formaldehyde solution, with rapid stirring. The printing paste thus obtained is used to print a mercerised cotton fabric, and the printed material obtained is dried and steamed in saturated steam at 103° C. for 8 minutes. The printed fabric is then rinsed and subsequently dried, giving an orange print.

What is claimed is:

1. A reactive dye of the formula

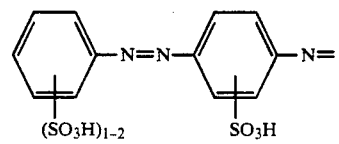

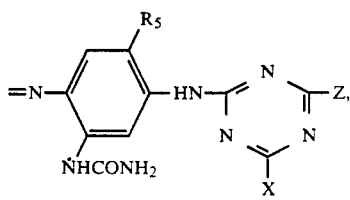

in which R$_5$ is hydrogen, methyl or methoxy, X is fluorine or chlorine and Z is amino; N-C$_1$-C$_6$alkylamino or N,N-di-C$_1$-C$_6$alkylamino, wherein the alkyl moiety or moieties are in each case unsubstituted or substituted by halogen, cyano, $C_1$-$C_4$alkoxy, hydroxyl, carboxyl or sulfo; N-cyclohexylamino or N-$C_1$-$C_6$alkyl-N-cyclohexylamino; benzylamino, phenethylamino, phenylamino, or naphthylamino, wherein the aryl moiety is in each case unsubstituted or substituted by halogen, nitro, cyano, trifluoromethyl, sulfamoyl, carbamoyl, $C_1$-$C_4$alkyl, $C_1$-$C_4$alkoxy, acetylamino, ureido, hydroxyl, carboxyl, sulfomethyl or sulfo; N-$C_1$-$C_6$alkyl-N-phenylamino wherein both the alkyl and phenyl moiety are each unsubstituted or substituted as mentioned above; or is furaneamino, thiopheneamino, pyrazoleamino, pyridineamino, pyrimidineamino, quinolineamino, benzimidazoleamino, benzthiazoleamino, benzoxazoleamino, morpholino, piperidino or piperazino, each of which heterocyclic radicals being unsubstituted or substituted by halogen, nitro, cyano, trifluoromethyl, sulfamoyl, carbamoyl, $C_1$-$C_4$alkyl, $C_1$-$C_4$alkoxy, acetylamino, ureido, hydroxyl, carboxyl, sulfomethyl or sulfo.

2. A reactive dye according to claim 1, in which Z is a sulfo- or disulfophenylamino radical.

3. A reactive dye according to claim 1, in which X is chlorine.

4. A reactive dye of the formula

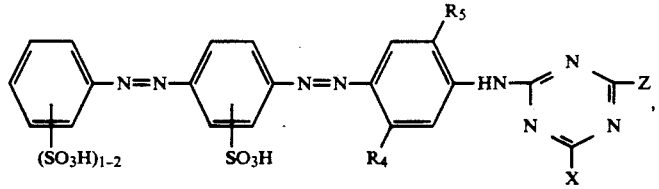

in which $R_4$ is hydrogen, methyl, methoxy, ureido or acetylamino, $R_5$ is hydrogen, methyl or methoxy, X is fluorine or chlorine and Z is a radical of the formula

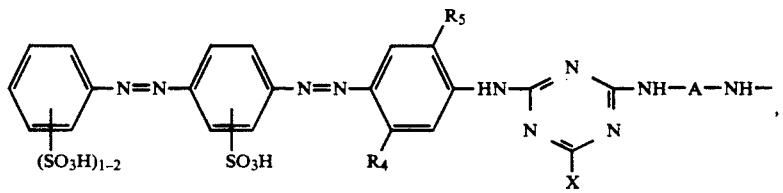

wherein A is $C_2$-$C_6$alkylene or sulfophenylene and X, $R_4$ and $R_5$ are as defined above.

5. A reactive dye according to claim 1, of the formula

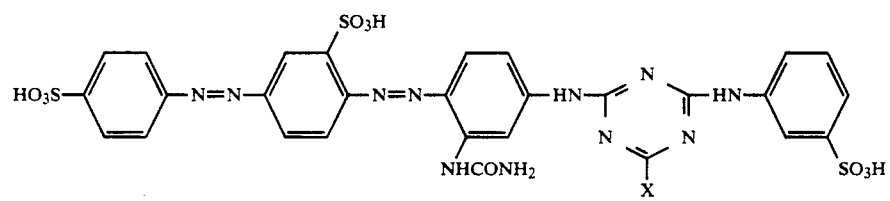

in which X is fluorine or chlorine.

6. A reactive dye according to claim 4, of the formula

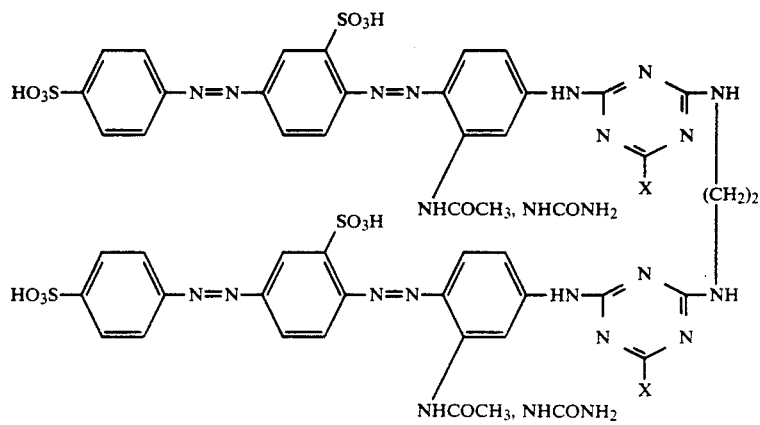

or

-continued
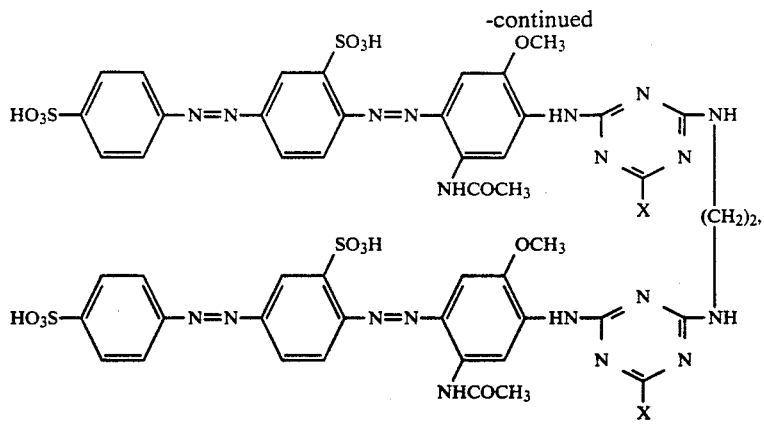
in which X is fluorine or chlorine.
7. A process for dyeing or printing of cellulose-containing fiber materials, which comprises contacting said materials with a reactive dye according to claim 1.
8. A process of dyeing or printing of cellulose-containing fiber materials, which comprises contacting said materials with a reactive dye according to claim 4.
* * * * *